(12) United States Patent
Morrison et al.

(10) Patent No.: US 6,252,374 B1
(45) Date of Patent: Jun. 26, 2001

(54) APPARATUS FOR RECONDITIONING BATTERIES

(75) Inventors: Kenneth A. Morrison; Victoria Hartlove-Morrison, both of Carson City, NV (US)

(73) Assignee: KVA Advanced Technologies, Inc., Carson City, NV (US)

( * ) Notice: Subject to any disclaimer, the term of this patent is extended or adjusted under 35 U.S.C. 154(b) by 0 days.

(21) Appl. No.: 09/392,071

(22) Filed: Sep. 8, 1999

(51) Int. Cl.⁷ ..................................... H01M 10/46
(52) U.S. Cl. ........................ 320/113; 320/131; 320/135
(58) Field of Search .................................. 320/112, 107, 320/127, 131, 135, 136, 113

(56) References Cited

U.S. PATENT DOCUMENTS 3,729,664 * 4/1973 Montross .
3,914,679 * 10/1975 Sullivan .
5,408,842 * 4/1995 Goto et al. .

* cited by examiner

*Primary Examiner*—Edward H. Tso
(74) *Attorney, Agent, or Firm*—Lariviere, Grubman & Payne, LLP

(57) ABSTRACT

The invention is a reconditioner for batteries to remove the "memory effect" or "voltage depression", which is caused by the failure to completely discharge a battery before recharging the battery. The invention places a closed circuit with a low resistance between the positive and negative terminals of a battery. A threshold device is used to stop the current flow after the battery is discharged to a certain level. Some embodiments of the invention provide an indicator to indicate when a battery is sufficiently discharged. Other embodiments also provide a recharger, which recharges the battery after the battery is sufficiently discharged.

15 Claims, 12 Drawing Sheets

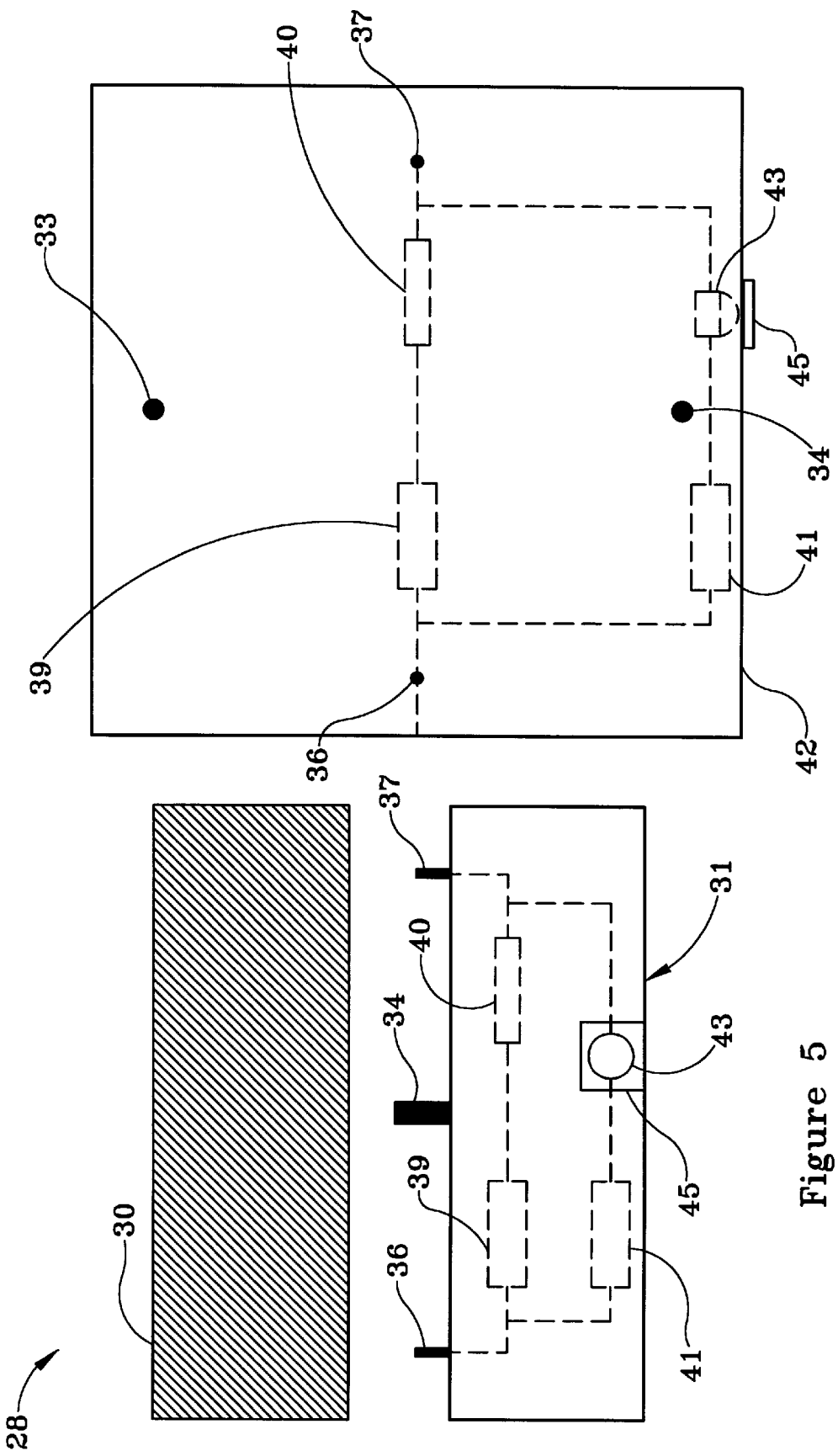

APPARATUS FOR RECONDITIONING BATTERIES

FIELD OF THE INVENTION

The present invention relates to rechargeable batteries. More specifically, the invention relates to extending the life of rechargeable batteries.

BACKGROUND OF THE INVENTION

Rechargeable batteries suffer from a "memory effect", which limits the life of a rechargeable battery. The "memory effect" is caused by the incomplete discharging of a battery before the battery is recharged. The continual failure to completely discharge a battery before the battery is recharged creates a "memory effect", where the battery "remembers" the level to which it was discharged. In subsequent use, the battery will discharge to the level that it "remembers" discharging to (instead of completely discharging), which reduces the useful life of the battery between charges.

Although it is recognized that older types of nickel-cadmium (NiCad) batteries are subject to a "memory effect", battery manufacturers claim that newer types of NiCad batteries, nickel metal hydride (NiMH) and Lithium batteries (lithium ion (Li-ion) or lithium-polymer batteries) are not subject to the "memory effect". For example, in the owner's manual for the SONY™ Digital Still Camera MVC-FD83/FD88 it states "You may also charge a partially used pack whenever you desire with no adverse affect on the battery pack."

In EDN Access Magazine in the cover story of the Feb. 4, 1999 edition entitled "Batteries Clean Up Their Act" by Dan Strassberg it is stated that "Most battery manufacturers insist that memory effect is an urban legend. . ." The article goes on to state, "Whereas battery manufacturers generally agree that the memory effect is fiction, most concede that you might confuse a real phenomenon called 'voltage depression' with memory effect. However, according to legend, the memory effect is irreversible, whereas voltage depression is fully reversible."

The invention recognizes that even the newer NiCad batteries NIMH batteries and Lithium batteries are subject to the memory effect or voltage depression.

It would be advantageous to extend the lifetime of a battery

BRIEF SUMMARY OF THE INVENTION

It is an object of the invention to provide a method and apparatus for reconditioning a battery to extend the lifetime of the battery.

Accordingly, the foregoing object is accomplished providing a battery reconditioner, which discharges the battery to a predetermined voltage level below a memory effect level. The invention provides an apparatus for reconditioning a battery with a positive terminal and negative terminal, comprising: means for holding the battery; a first contact, which forms an electrical connection with the positive terminal of the battery, when the battery is in the means for holding the battery; a second contact, which forms an electrical connection with the negative terminal of the battery, when the battery is in the means for holding the battery; a resistor electrically connected to the first contact; a heat sink in contact with and surrounding the resistor; and a threshold voltage device electrically connected between the resistor and the second contact.

Other features of the present invention are disclosed or apparent in the section entitled: "DETAILED DESCRIPTION OF THE INVENTION."

BRIEF DESCRIPTION OF DRAWINGS

For a fuller understanding of the present invention, reference is made to the accompanying drawings wherein:

FIG. 5 is a side view of another embodiment of a battery reconditioner.

FIG. 6 is a top view of the base of the battery reconditioner shown in FIG. 5.

Figure 1:
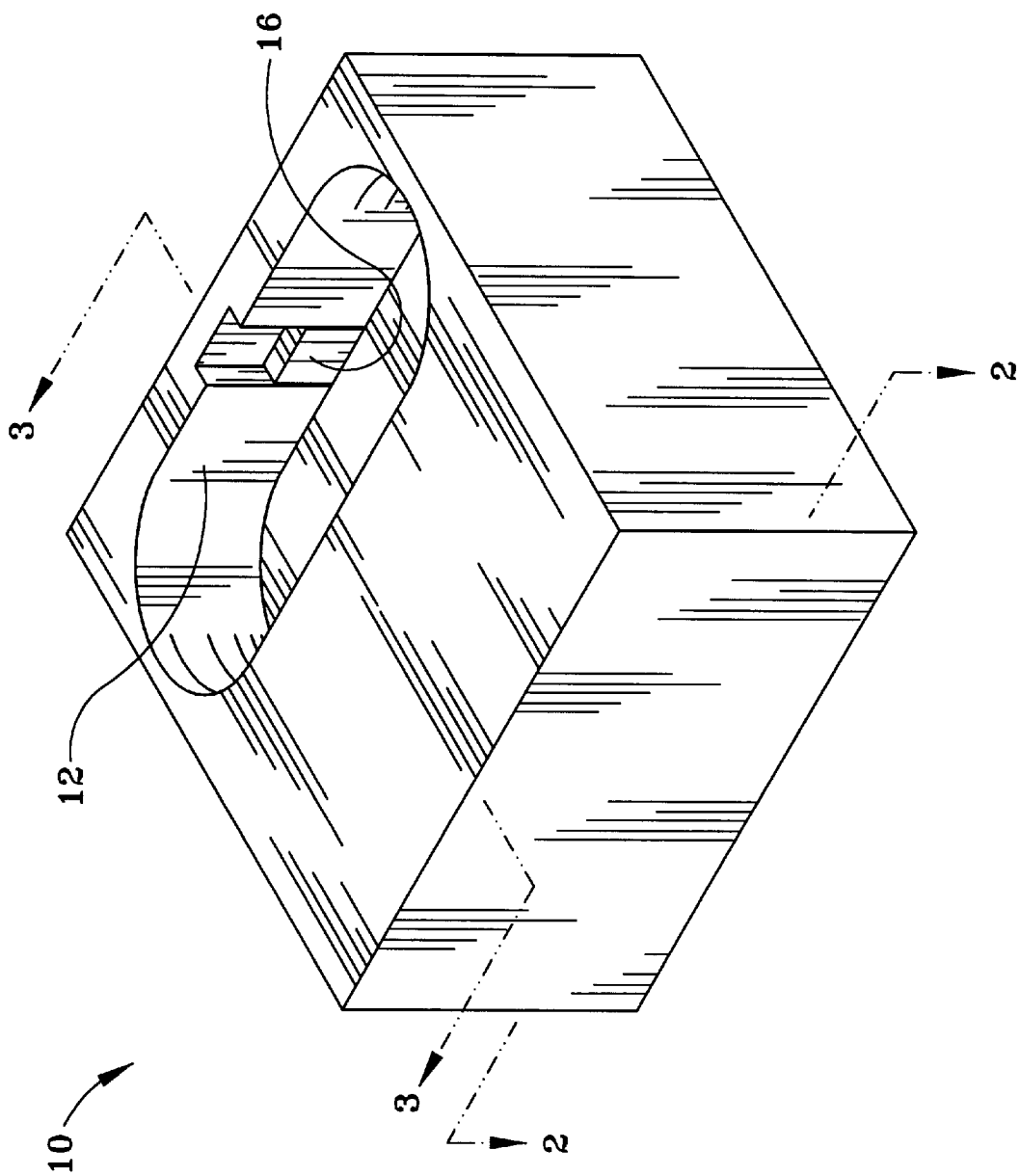
FIG. 1 is a perspective view of an embodiment of a battery reconditioner.

Reference numbers refer to the same or equivalent parts of the present invention throughout the several figures of the drawing.

DETAILED DESCRIPTION OF THE INVENTION AND BEST MODE OF THE INVENTION

Figure 3:
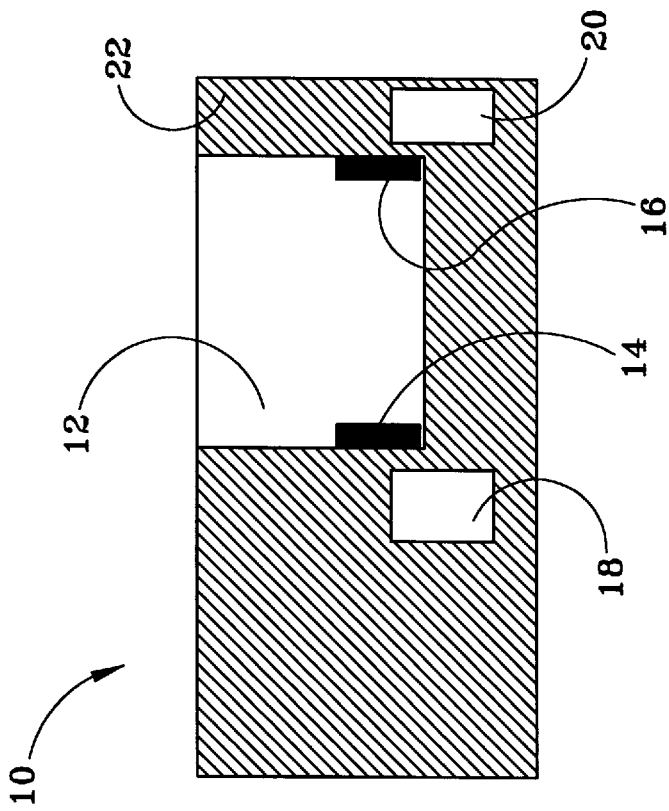
FIG. 3 is a cross-sectional side view of the reconditioner shown in FIG. 1, along view lines 3.
Figure 2:
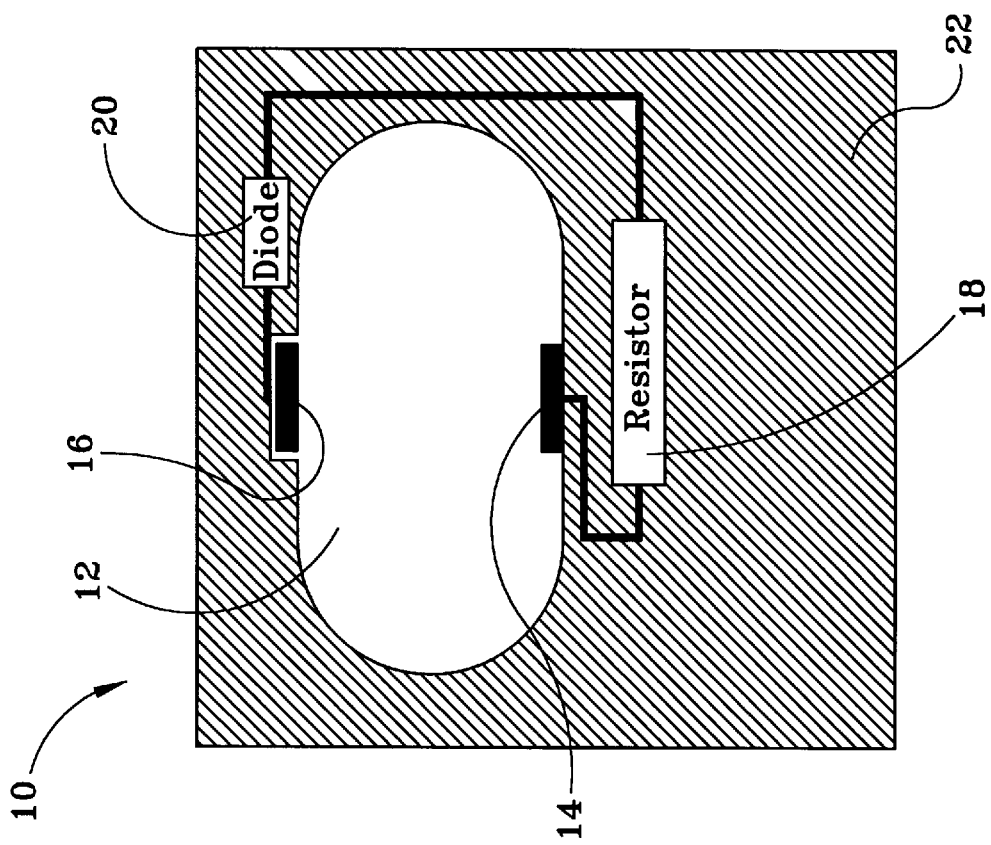
FIG. 2 is a cross-sectional top view the reconditioner shown in FIG. 1, along view lines 2.
Figure 4:
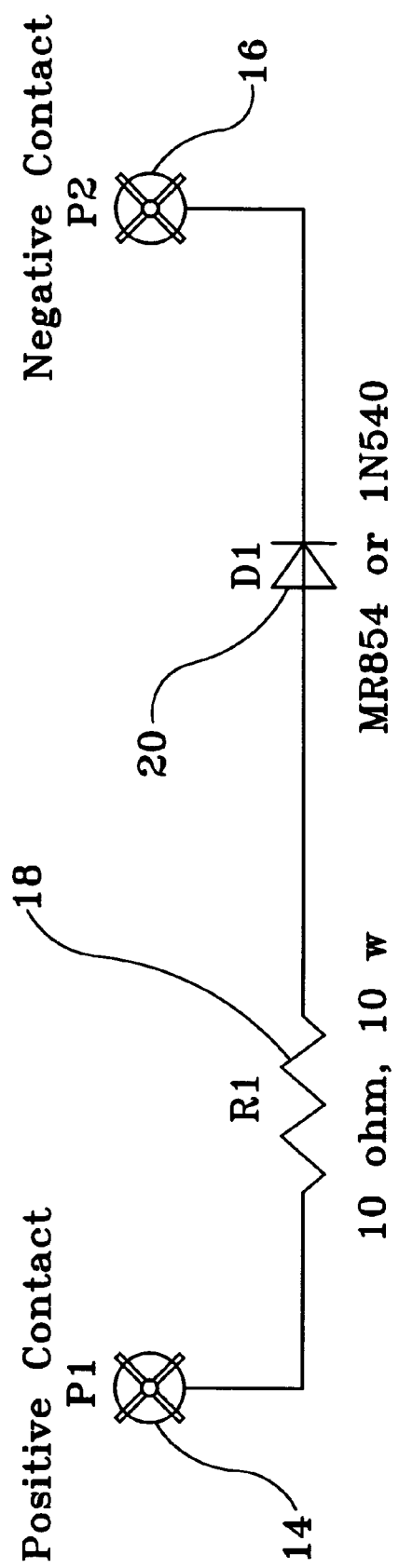
FIG. 4 is an electrical schematic diagram of the reconditioner shown in FIG. 1.

The reconditioner 10, shown in FIGS. 1, 2, and 3, comprises a socket 12, a first contact 14, a second contact 16, a resistor 18, and a diode 20 within a solid housing 22 of epoxy. The socket 12 is formed as a partial hole with sides in the solid housing 22. The first contact 14 and the second contact 16 placed on sides of the socket 12. The first contact 14 and the second contact 16 may be placed on the same side of the socket 12 or on different sides of the socket. As illustrated in FIGS. 2 and 4, the first contact 14, which is a positive contact, is electrically connected to a first end of the resistor 18. A second end of the resistor 18 is electrically connected to a first end of the diode 20. A second end of the diode 20 is electrically connected to the second contact 16.

In a preferred embodiment of the invention the resistor 18 has a resistance of 10 ohms. The total resistance of the circuit from the first contact 14 to the second contact 16, is the resistance caused by the resistance from the electrical connection between the first contact 14 and the resistor 18, the resistor 18, the electrical connection between the resistor 18 and diode 20, and the electrical connection between the diode 20 and the second contact 16 and is between 9 and 15 ohms. In other preferred embodiments the total resistance of the circuit is in the range of 0.01 to 1,000 ohms. The diode 20 is forward biased to allow current flowing from the first contact 14 to the second contact 16, but has a threshold voltage so to prevent current flow below the threshold voltage. In the preferred embodiment, the diode 20 has a threshold voltage of 0.6 volts (V). A preferable range of threshold voltages are voltages with a magnitude from 0.001 volts to 2.500 volts.

In the preferred embodiment, both the resistor 18 and the diode 20 are in contact with the epoxy forming the solid housing 22.

In operation, a battery is placed in the socket 12. The sides of the socket 12 function as a battery holder, which holds the battery in place aligning the battery terminals with the first and second contacts 14, 16, so that the positive terminal of the battery is in contact with the first contact 14 and the negative terminal of the battery is in contact with the second contact 16. The reconditioner 10 discharges the battery, by allowing current to flow from the positive terminal, through the first contact 14 through the resistor 18, through the diode 20, through the second contact 16, to the negative terminal of the battery. The resistor 18 and diode 20 prevent the reconditioner 10 from acting as a dead short. The epoxy of the solid housing 22 acts as a heat sink for the resistor 18 and the diode 20 to dissipate heat caused by the power absorbed by the resistor 18 and diode 20. Once the voltage in the battery falls below the threshold voltage of the diode 20, the diode 20 stops the current flow. Maintaining a small voltage at about the threshold voltage allows the battery to be more easily recharged by some recharging devices.

Figure 7:
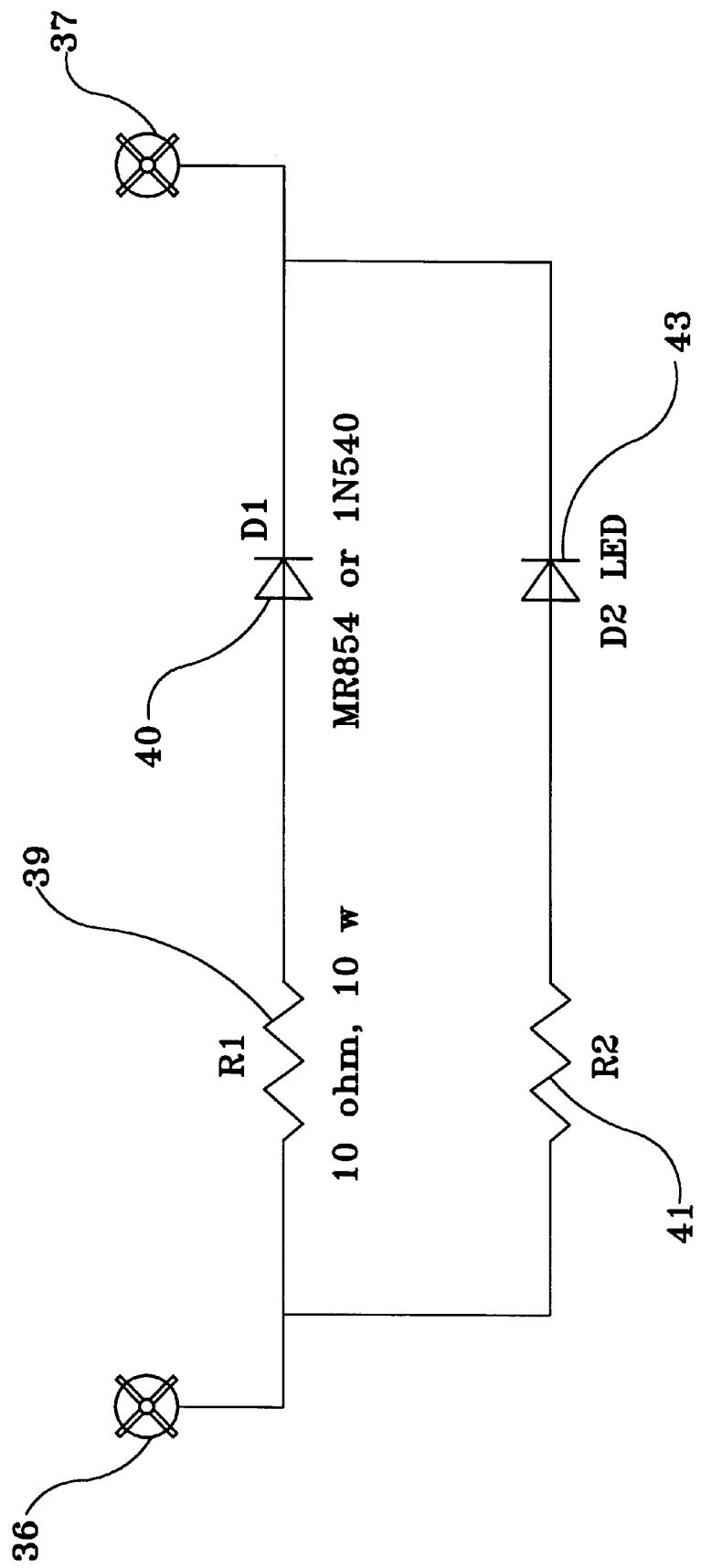
FIG. 7 is an electrical schematic diagram of the reconditioner shown in FIG. 5.

FIG. 5 is a side view of another battery reconditioner 28, which comprises an adapter 30 and a base 31. The base 31, of which a top view is shown in FIG. 6, comprises a first alignment pin 33, second alignment pin 34, a first base contact 36, a second base contact 37, a first resistor 39 electrically connected to the first base contact 36, a diode 40 electrically connected between the resistor 39 and the second base contact 37, a second resistor 41 electrically connected to the first base contact 36, a light emitting diode 43 electrically connected between the second resistor 41 and the second base contact 37, and a base housing 42 supporting the first alignment pin 33, the second alignment pin 34, the first base contact 36 the second base contact 37, the first resistor 39, the second resistor 41, the light emitting diode 43 and the diode 40. The base housing 42 has a window 45 adjacent to the light emitting diode 43. FIG. 7 is an electrical schematic diagram of the base 31.

In a preferred embodiment of the base 31, the first resistor 39 and second resistor 41 each have a resistance of 10 ohms, so that the total resistance of the circuit between the first base contact 36 to the second base contact 37 is between 9 and 15 ohms. In other preferred embodiments the total resistance of the circuit is in the range of 0.01 to 1,000 ohms. The diode 40 and light emitting diode 43 are forward biased to allow current flowing from the first base contact 36 to the second base contact 37, but has a threshold voltage so to prevent current flow below the threshold voltage.

In the preferred embodiment, the first resistor 39, the diode 40, and the second diode 41 are in contact with the epoxy forming the base housing 42.

Figure 8:
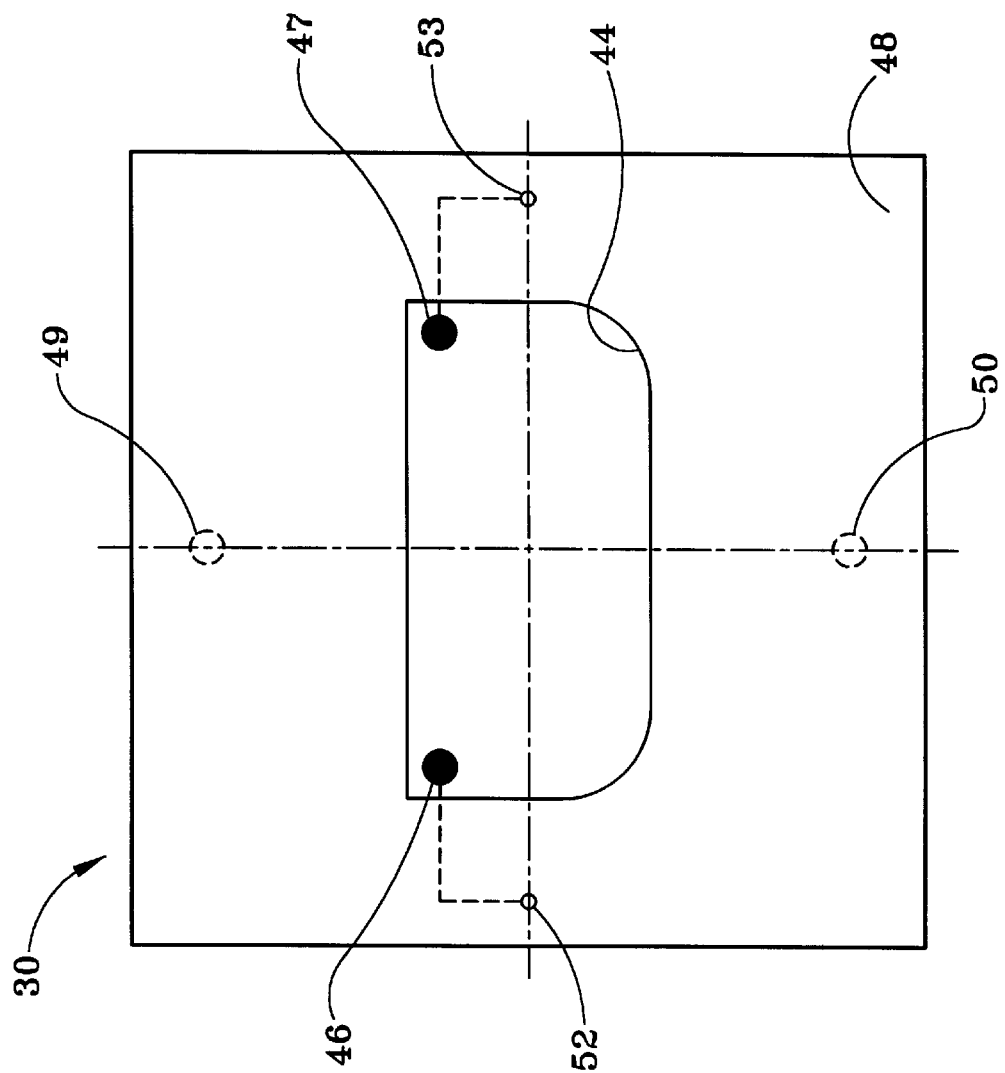
FIG. 8 is a top view of the adapter of the battery reconditioner shown in FIG. 5.

FIG. 8 is a top view of the adapter 30. The adapter 30 comprises an adapter body 48 with a socket 44 with sides on a surface of the adapter 30, a first contact 46 on a bottom side of the socket 44, a second contact 47 on the bottom side of the socket 44, a first alignment hole 49 on a bottom surface of the adapter 30, a second alignment hole 50 on the bottom surface of the adapter 30, a first adapter contact 52 on the bottom surface of the adapter 30 and electrically connected to the first contact 46, and a second adapter contact 53 on the bottom surface of the adapter 30 and electrically connected to the second contact 47.

In operation, the adapter 30 is placed on the base 31, with the first alignment pin 33 being inserted into the first alignment hole 49 and the second alignment pin 34 being inserted into the second alignment hole 50. This causes the first base contact 36 to be inserted into the first adapter contact 52 and the second base contact 37 to be inserted into the second adapter contact 53. Thus the first contact 46 becomes electrically connected to the first resistor 39 and second resistor 41, and the second contact 47 becomes electrically connected to the diode 40 and the light emitting diode 43. The socket 44 is shaped to receive a SONY™ lithium battery. The battery is placed in the socket 44. The sides of the socket 44 function as a battery holder, which holds the battery in place aligning the battery terminals with the first and second contacts 46, 47, so that the positive terminal of the battery is in contact with the first contact 46 and the negative terminal of the battery is in contact with the second contact 47. The reconditioner 28 discharges the battery, by allowing current to flow from the positive terminal, through the first contact 46, through the first resistor 39, through the diode 40, through the second contact 47 to the negative terminal of the battery and from the first contact 46, through the second resistor 41, through the light emitting diode 43, through the second contact 47 to the negative terminal of the battery. The first resistor 39, the second resistor 41, the light emitting diode 43, and the diode 40 prevent the reconditioner 28 from acting as a dead short. The base housing 42 acts as a heat sink for the first resistor 39, the second resistor 41 and the diode 40 to dissipate heat caused by the power absorbed by the resistor 39 and diode 40. The light emitting diode 43 emits a light, which passes through the window 45 and indicates that the battery is discharging. Once the voltage in the battery falls below the threshold voltage of the diode 40 and the light emitting diode 43, the diode 40 and light emitting diode 43 stop the current flow, so that the light emitting diode 43 stops emitting light, which indicates that the battery discharge is completed. Maintaining a small voltage at about the threshold voltage of the diode 40 and light emitting diode allows the battery to be more easily recharged by some recharging devices.

Figure 9:
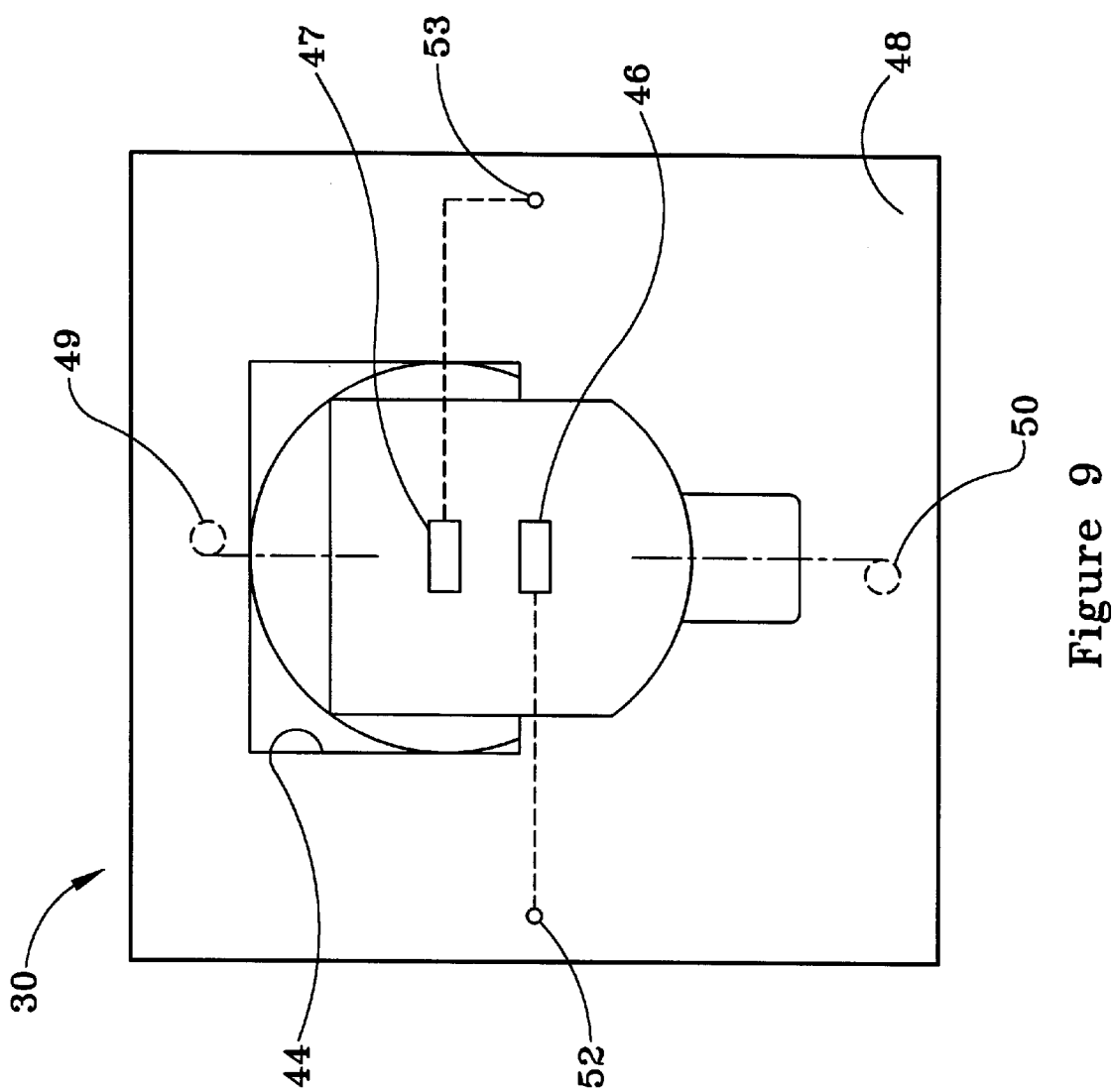
FIG. 9 is a top view of another adapter of the battery reconditioner shown in FIG. 5.

FIG. 9 is a top view of the adapter 30'. The adapter 30' comprises an adapter body 48 with a socket 44 with sides on a surface of the adapter 30', a first contact 46 on a bottom side of the socket 44, a second contact 47 on the bottom side of the socket 44, a first alignment hole 49 on a bottom surface of the adapter 30', a second alignment hole 50 on the bottom surface of the adapter 30', a first adapter contact 52 on the bottom surface of the adapter 30' and electrically connected to the first contact 46, and a second adapter contact 53 on the bottom surface of the adapter 30' and electrically connected to the second contact 47.

In operation, the adapter 30' is placed on the base 31, with the first alignment pin 33 being inserted into the first alignment hole 49 and the second alignment pin 34 being inserted into the second alignment hole 50. This causes the first base contact 36 to be inserted into the first adapter contact 52 and the second base contact 37 to be inserted into the second adapter contact 53. Thus the first contact 46 becomes electrically connected to the first resistor 39 and second resistor 41, and the second contact 47 becomes electrically connected to the diode 40 and the light emitting diode 43. The socket 44 is shaped to receive a DeWALTT™ battery. The battery is placed in the socket 44. The sides of the socket 44 function as a battery holder, which holds the battery in place aligning the battery terminals with the first and second contacts 46, 47, so that the positive terminal of the battery is in contact with the first contact 46 and the negative terminal of the battery is in contact with the second contact 47. The reconditioner 28 discharges the battery, by allowing current to flow from the positive terminal, through the first contact 46, through the first resistor 39, through the diode 40, through the second contact 47 to the negative terminal of the battery and from the first contact 46, through the second resistor 41, through the light emitting diode 43, through the second contact 47 to the negative terminal of the battery. The first resistor 39, the second resistor 41, the light emitting diode 43, and the diode 40 prevent the reconditioner 28 from acting as a dead short. The base housing 42 acts as a heat sink for the first resistor 39, the second resistor 41 and the diode 40 to dissipate heat caused by the power absorbed by the resistor 39 and diode 40. The light emitting diode 43 emits a light, which passes through the window 45 and indicates that the battery is discharging. Once the voltage in the battery falls below the threshold voltage of the diode 40 and the light emitting diode 43, the diode 40 and light emitting diode 43 stop the current flow, so that the light emitting diode 43 stops emitting light, which indicates that the battery discharge is completed. Maintaining a small voltage at about the threshold voltage of the diode 40 and light emitting diode allows the battery to be more easily recharged by some recharging devices.

Figure 11:
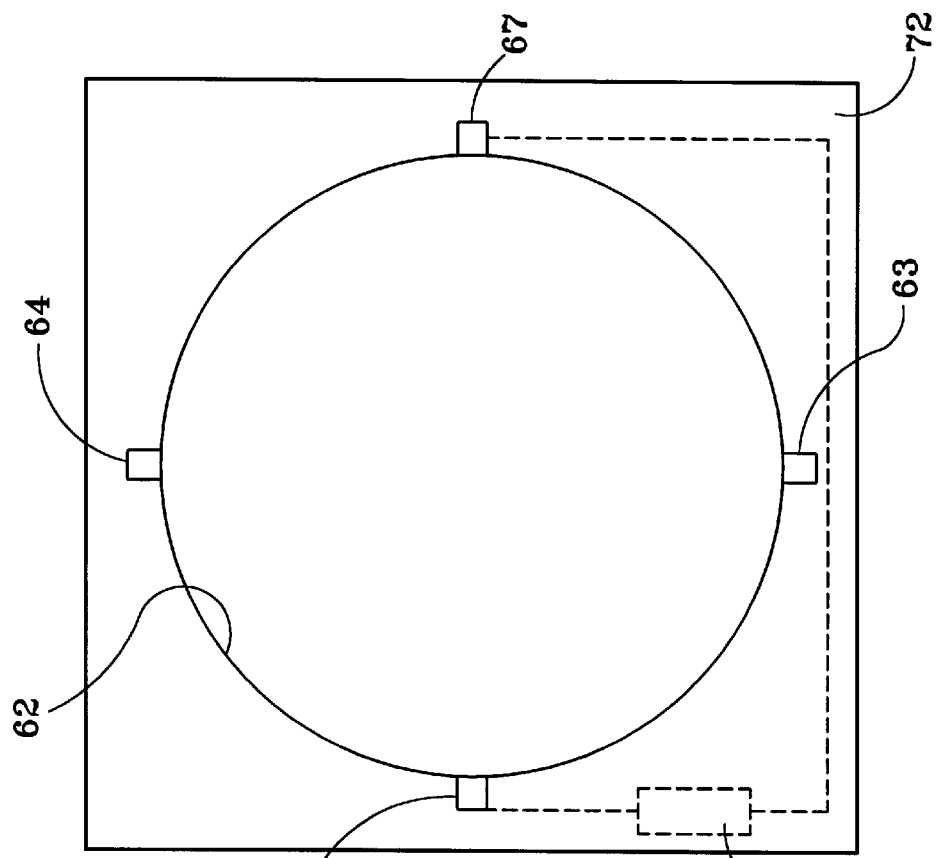
FIG. 11 is a top view of the base of the battery reconditioner shown in FIG. 10.
Figure 10:
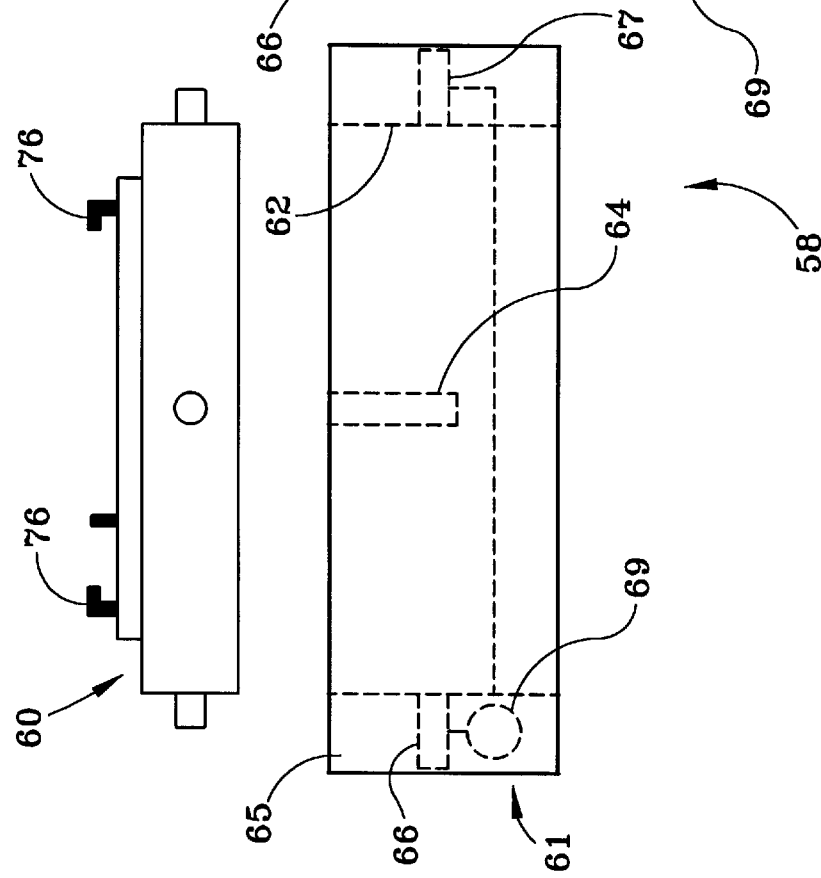
FIG. 10 is a side view of another embodiment of a battery reconditioner.

FIG. 10 is a side view of another battery reconditioner 58, which comprises an adapter 60 and a base 61. The base 61, of which a top view is shown in FIG. 11, comprises base socket 62, a first alignment slot 63, second alignment slot 64, a first base contact 66, a second base contact 67, a resistor 69 electrically between the first base contact 66 and the second base contact 67, and a base housing 72 forming the first alignment slot 63 and the second alignment slot 64 and supporting the first base contact 66 the second base contact 67, and the resistor 69.

Figure 12:
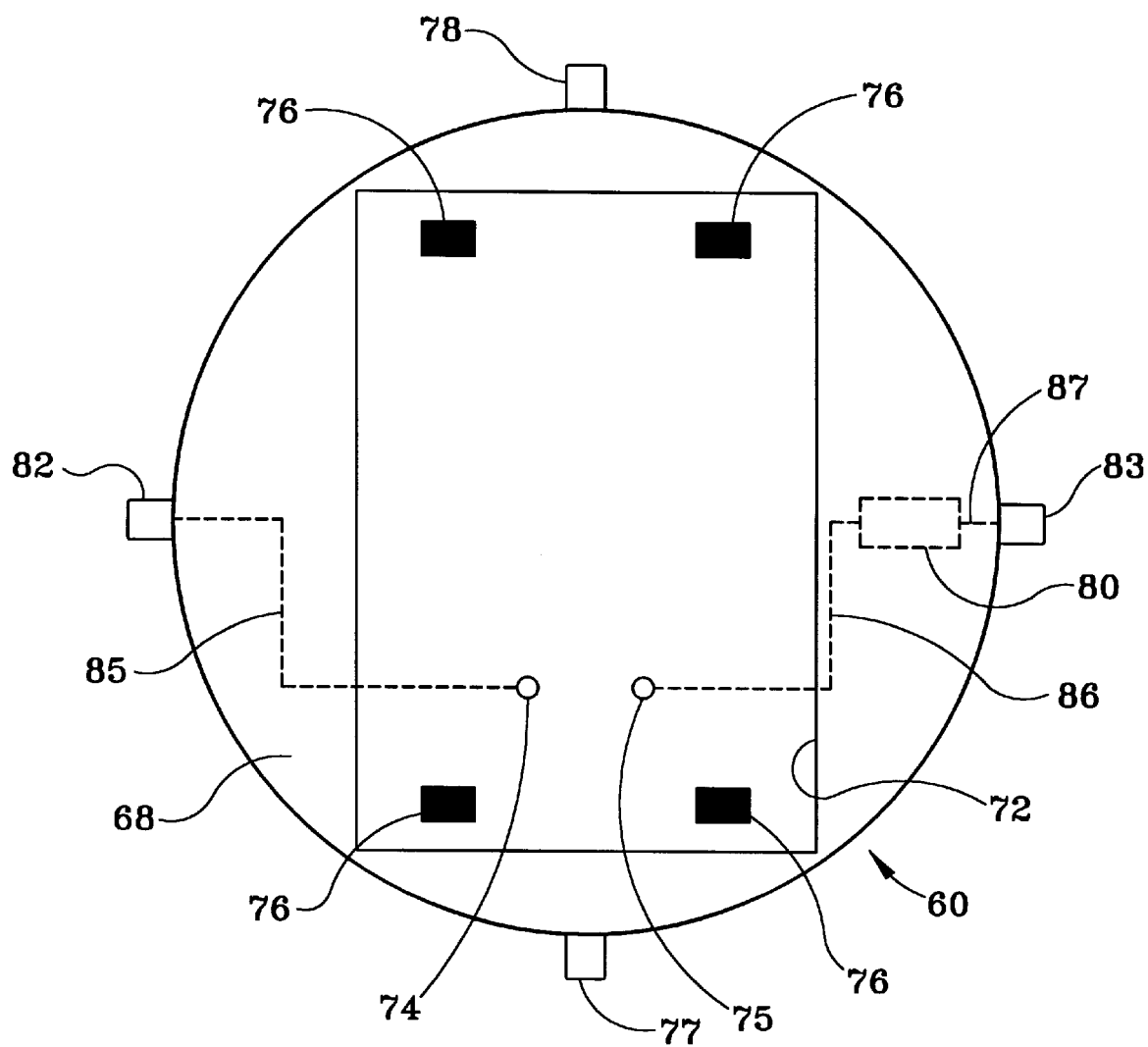
FIG. 12 is a top view of the adapter of the battery reconditioner shown in FIG. 10.

FIG. 12 is a top view of the adapter 60. The adapter 60 comprises an adapter body 68, which is shaped to fit into the base socket, a socket 72 with sides on a surface of the adapter body 68, a first contact 74 on a bottom side of the socket 72, a second contact 75 on the bottom side of the socket 72, attachment means 76 connected to the adapter body 68, a first alignment pin 77 on a side of the adapter body 68, a second alignment pin 78 on a side the adapter body 68, a transistor 80 embedded within the adapter body 68, a first adapter contact 82 on a side of the adapter body 68, and a second adapter contact 83 on a side of the adapter body 68. A first wire 85 provides an electrical contact between the first adapter contact 82 and the first contact 74. A second wire 86 provides an electrical connection between the second contact 75 and a first end of the transistor 80. A third wire 87 provides an electrical connection between a second end of the transistor 80 and the second adapter contact 83.

Figure 13:
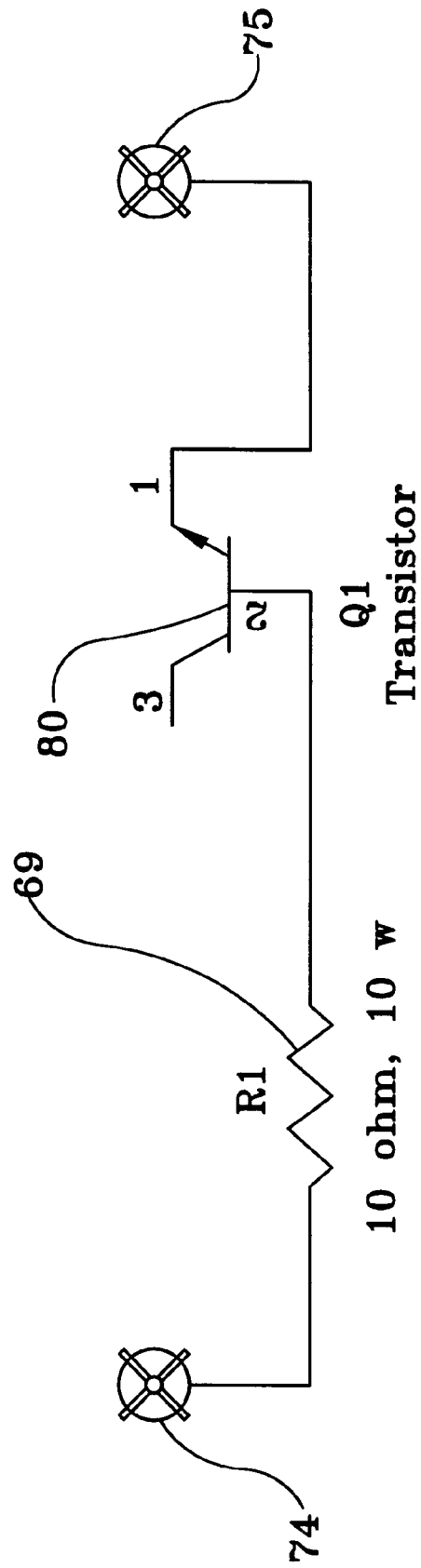
FIG. 13 is an electrical schematic diagram of the reconditioner shown in FIG. 10.

In operation, the socket 72 is shaped to receive an Energizer™SONY™ battery. The battery is placed in the socket 72. The sides of the socket 72 and the attachment means 76 form a battery holder, which holds the battery in place aligning the battery terminals with the first and second contacts 74, 75, so that the positive terminal of the battery is in contact with the first contact 74 and the negative terminal of the battery is in contact with the second contact 75. The adapter 60 is placed in the base 61, with the first alignment pin 77 being inserted into the first alignment slot 63 and the second alignment pin 78 being inserted into the second alignment slot 64. This causes the first base contact 66 to connect with the first adapter contact 82 and the second base contact 67 to connect with the second adapter contact 83. Thus the first contact 74 becomes electrically connected a first end of the resistor 69 through the first adapter contact 82 and the first base contact 66. A second end of the resistor 69 becomes electrically connected to a second end of the transistor 80 through the second base contact 67 and the second adapter contact 83. The resulting electrical circuit is illustrated schematically in FIG. 13. The reconditioner 58 discharges the battery, by allowing current to flow from the positive terminal, through the first contact 74, through the first adapter contact 82, through the first base contact 66, through the resistor 69, through the second base contact 67, through the second adapter contact 83, through the transistor 80, through the second contact 75 to the negative terminal of the battery. The resistor 69 and the transistor 80 prevent the reconditioner 58 from acting as a dead short. The base housing 65 acts as a heat sink for the first resistor 69. The adapter body 68 acts as a heat sink for the transistor 80. Once the voltage in the battery falls below the threshold voltage of the transistor 80, the transistor 80 stops the current flow. Maintaining a small voltage at about the threshold voltage of the transistor 80 allows the battery to be more easily recharged by some recharging devices.

As in the previous embodiment, other adapters may be used for other batteries. In this embodiment a transistor 80 is used in the place of a diode, and the transistor 80 is placed in the adapter, to allow the use of different transistors or diodes with different threshold voltages for different batteries, allowing the selection of the diode to be determined by specific properties of the battery.

Figure 14:
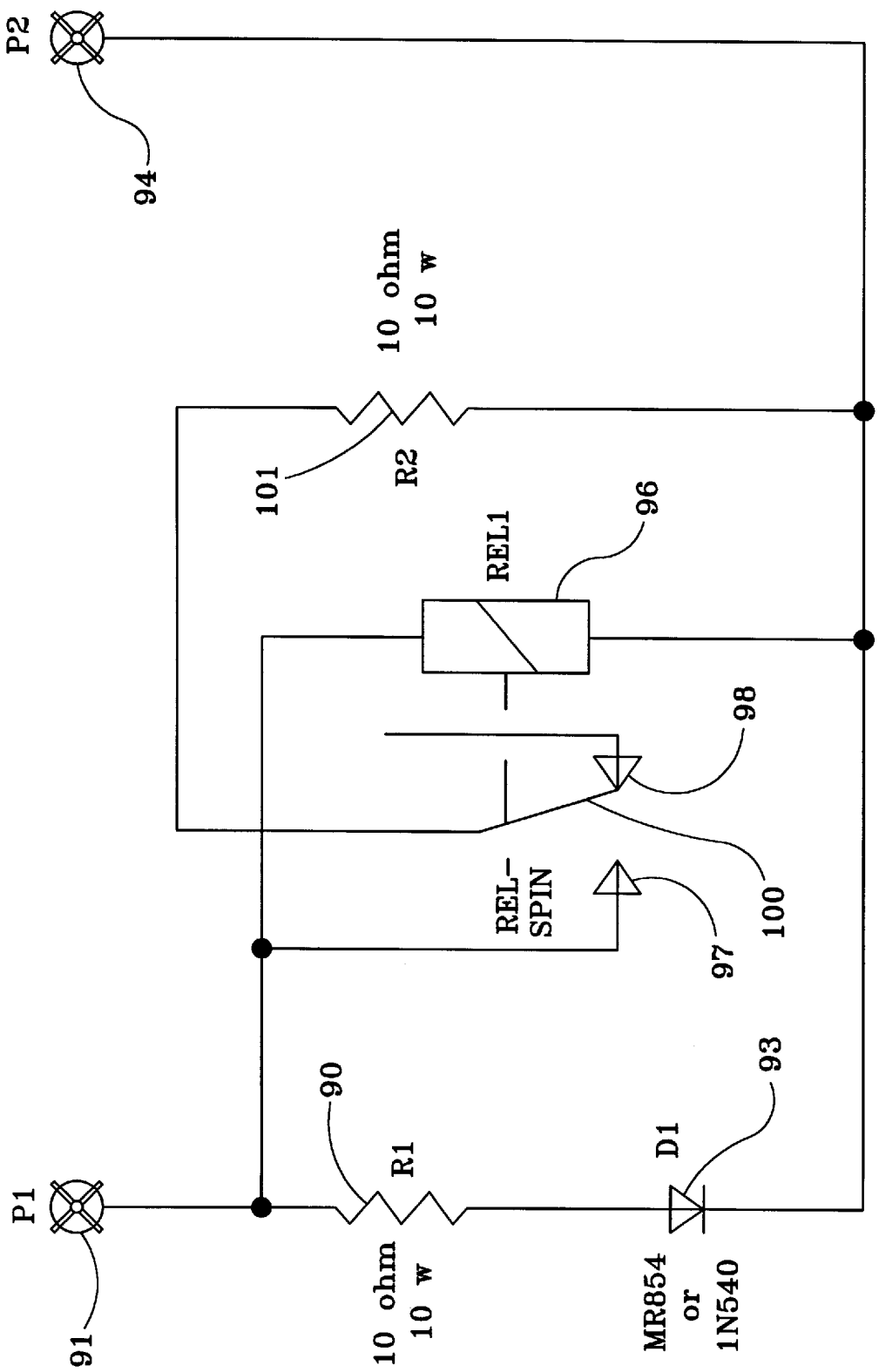
FIG. 14 is an electrical schematic diagram of another embodiment of a reconditioner.

FIG. 14 is an electrical schematic of another embodiment of the invention. A first end of a first resistor 90 is electrically connected to a first contact 91. A first end of a diode 93 is electrically connected to a second end of the first resistor 90. A second end of the diode is electrically connected to a second contact 94. A first end of a relay 96, with an on contact 97 and an off contact 98, is electrically connected to the first contact 91. A second end of the relay 96 is electrically connected to the second contact 94. The on contact 97 is electrically connected to the first contact 91. The off contact 98 is electrically isolated. A first end of an armature 100 is moved between the on contact 97 and the off contact 98. A second end of the armature 100 is electrically connected to a first end of a second resistor 101. A second end of the second resistor 101 is electrically connected to the second contact 94. In the preferred embodiment, the first and second resistors 90, 101 are 10 ohms, so the total resistance of the circuit between the first contact 91 and the second contact 94 through the first resistor 90 is between 9 and 15 ohms. In other preferred embodiments the total resistance of the circuit is in the range of 0.01 to 1,000 ohms. In the preferred embodiment the total resistance of the circuit between the first contact 91 and the second contact 94 through the second resistor 101 is between 9 and 15 ohms. In other preferred embodiments the total resistance of the circuit is in the range of 0.01 to 1,000 ohms. A small amount of current passes from the first contact 91 through the relay 96 to the second contact 94, because the relay has a high resistance on the order of 500 ohms.

In operation, the first contact 91 is electrically connected to a positive terminal of a battery and the second contact 94 is electrically connected to a negative terminal of a battery.

When the battery has a high voltage, a high current passes from the first contact 91 through the relay 96 to the second contact 94, which causes the relay 96 to go to the on position, where the armature 100 contacts the on contact 97. Current flows from the first contact 91, through the on contact 97, through the second resistor 101 to the second contact. In addition, current flows from the first contact 91 through the first resistor 90, through the diode 93 to the second contact 94. Since current flows through the first resistor 90 and the second resistor 101 in parallel circuits, twice as much current is drained from the battery, allowing a faster drain time. In addition, the separate resistors allows better heat dissipation reducing the risk of fire or melting. As the power or voltage in the battery is reduced, the current passing through the relay 96 is not sufficient to keep the relay 96 in the "on" position and the armature 100 moves from being in contact with the on contact 97 to being in contact with the off contact 98. Current is no longer able to flow through the second resistor 101. Since current no long flows through the second resistor 101, the current flow is reduced, allowing for a more careful discharging of lower voltage or power batteries, until the battery reaches the threshold voltage of the diode 93. This electrical circuit could be used in place of the electrical circuit of the above mentioned battery reconditioners.

Figure 15:
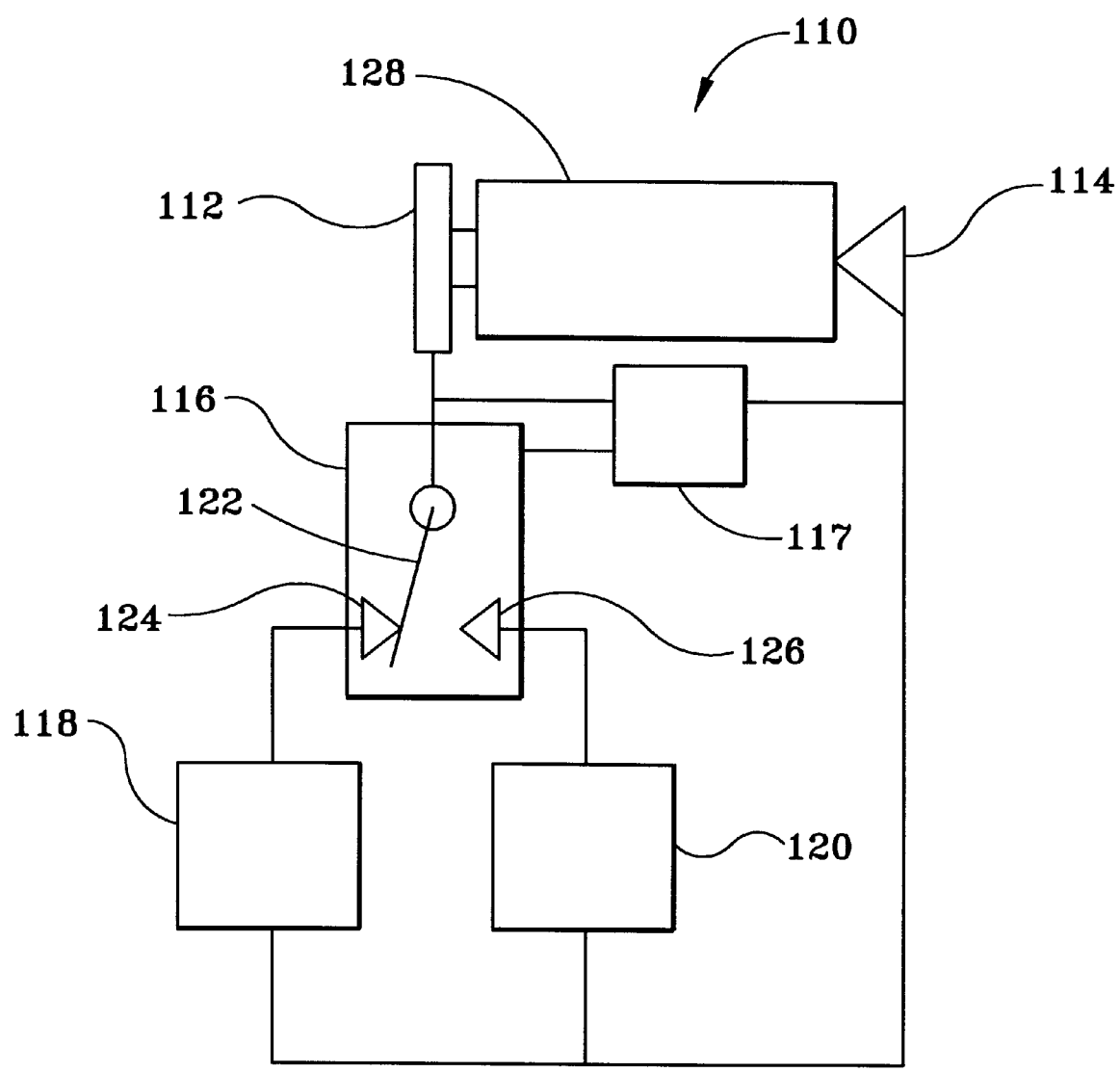
FIG. 15 is a block diagram of a reconditioner/recharger.

FIG. 15 is a schematic illustration of a reconditioner/recharger combination, which forms another embodiment of the invention. The recondition/recharger 110 comprises a first contact 112, a second contact 114, a switch 116, a switch controller 117, a reconditioner 118, and a recharger 120. In this embodiment the switch 116 is electrically connected to the first contact 112. The switch controller 117 is electrically connected to both the first contact 112 and the second contact 114, and controllably connected to the switch 116. A controllable connection is any connection such as an electrical or mechanical connection that allows the switch controller 117 to control the switch 116. The switch 116 is electrically connected to the reconditioner 118 and the recharger 120. The second contact 114 is electrically connected to the reconditioner 118 and the charger 120. In this embodiment of the invention, the first contact 112 is electrically connected to an armature 122 of the switch 116. A reconditioner contact 124 in the switch 116 is electrically connected to the reconditioner 118. A recharger contact 126 in the switch 116 is electrically connected to the recharger 120. The reconditioner 118 may be one of the previously mentioned reconditioners or may be a 10 ohm resistor electrically connected between the reconditioner contact 124 and the second contact 114. The recharger 120 is a recharger that is known in the art that is used for recharging a battery. Such rechargers are generally connected to a power source such as a 120V AC wall outlet.

In operation, a battery 128 is placed in the reconditioner/recharger 110 so that the positive terminal of the battery 128 is in electrical contact with the first contact 112 and the negative terminal of the battery 128 is in electrical contact with the second contact 114. The switch controller 117 sets the switch 116 so that the armature 122 contacts the reconditioner contact 124. Current flows from the positive terminal of the battery 128 through the first contact 112, through the armature 122, through the reconditioner contact 124, through the reconditioner 118, through the second contact 114 to the negative terminal of the battery 128. The switch controller 117 measures the voltage of the battery 128. When the voltage of the battery 128 reaches a threshold voltage, the switch controller 117 causes the armature 122 of the switch 116 to move from being in contact with the reconditioner contact 124 to being in contact with the recharger contact 126. The recharger 120 applies a voltage to the battery 128 so that a positive voltage is applied at the first contact 112 and a negative voltage is applied at the second contact 114, so that the applied voltage is slightly higher than the voltage of the battery. Current flows from the recharger 120 through the recharger contact 126, through the armature 116, through the first contact 112, through the positive terminal of the battery 128, through the negative terminal of the battery, through the second contact 114 back to the recharger 120. Once the battery 128 reaches a desired voltage the recharger 120 stops the applied voltage. The battery 128 is removed from the reconditioner/recharger 110 and the switch controller 117 resets the switch so that the armature 116 is placed in contact with the reconditioner contact 124.

In other embodiments of the reconditioner/recharger the switch controller 117 and the switch 116 may be combined to be a single unit. Such switches with an armature and contacts may be implemented mechanically or electrically using one or more transistors.

A threshold voltage device is a device that stops the current flow through the reconditioning circuit when a battery has discharged to a threshold voltage. As shown in the above embodiments, a transistor, a diode, or a switch and switch controller may be used as such a threshold voltage device. The total resistance is defined as the resistance from the first contact to the second contact, excluding the switching resistance from the threshold device, since the switching resistance from the threshold device changes over time, eventually increasing to stop the flow of current.

Information as herein shown and described in detail is fully capable of attaining the above-described object of the invention, it is understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

We claim:

1. An apparatus for reconditioning a battery with a first terminal and second terminal, comprising:
   a battery holder;
   a first contact, which forms an electrical connection with the first terminal of the battery, when the battery is in the battery holder;
   a second contact, which forms an electrical connection with the second terminal of the battery, when the battery is in battery holder;

a resistor electrically connected to the first contact;

a heat sink in contact with and surrounding the resistor; and a threshold voltage device electrically connected between resistor and the second contact.

2. The apparatus, as recited in claim 1, wherein there is a total resistance between the first contact and the second contact, wherein the total resistance is between 9 and 15 ohms.

3. The apparatus, as recited in claim 1, wherein there is a total resistance between the first contact and the second contact, wherein the total resistance is in the range of 0.01 to 1,000 ohms.

4. The apparatus, as recited in claim 3, wherein the threshold voltage device has a threshold voltage with a magnitude from 0.001 volts to 2.500 volts.

5. The apparatus, as recited in claim 4, further comprising:

a base, comprising:

a base body, wherein part of the base body forms the heat sink;

a first base contact supported by the base body; and a second base contact supported by the base body; and an adapter, comprising:

an adapter body which supports the battery holder, the first contact and the second contact;

a first adapter contact supported by the adapter body; and a second adapter contact supported by the adapter body.

6. The apparatus, as recited in claim 5, further comprising means for aligning the base body with the adapter body so that the first base contact is in contact with the first adapter contact and the second base contact is in contact with the second adapter contact.

7. The apparatus, as recited in claim 6, wherein the threshold voltage device is supported by the adapter body and the threshold voltage device is electrically connected between the second adapter contact and the second contact.

8. The apparatus, as recited in claim 3, wherein the threshold voltage device is a diode with a forward bias to allow current to flow from the first contact to the second contact.

9. The apparatus, as recited in claim 3, wherein the threshold device is a transistor.

10. The apparatus, as recited in claim 3, further comprising:

a second resistor electrically connected to the first contact in parallel with the resistor; and a light emitting diode electrically connected between the second resistor and the second contact.

11. The apparatus, as recited in claim 3, further comprising:

a relay, electrically connected between the first contact and the second contact in parallel with the resistor, wherein the relay comprises:

an armature:

an off contact; and an on contact, electrically connected to the first contact; and a second resistor electrically connected between the armature and the second contact.

12. The apparatus, as recited in claim 11, wherein the resistor has a resistance and the second resistor has a resistance, wherein the resistance of the resistor is equal to the resistance of the second resistor.

13. The apparatus, as recited in claim 3, wherein the threshold device comprises:

a switch electrically connected between the second contact and the resistor; and a switch controller controllably connected to the switch and electrically connected between the first contact and the second contact.

14. The apparatus, as recited in claim 13, further comprising a recharger electrically connected between the switch and the first contact.

15. The apparatus, as recited in claim 14 wherein the switch controller comprises:

means for measuring the voltage of the battery;

means for controlling the switch.

* * * * *